US012667034B2

(12) United States Patent
Kappelman

(10) Patent No.:  US 12,667,034 B2
(45) Date of Patent:       Jun. 30, 2026

(54) HITCHING ASSEMBLY

(71) Applicant: Deere & Company, Moline, IL (US)

(72) Inventor: Jacob D. Kappelman, Bloomfield, IA (US)

(73) Assignee: Deere & Company, Moline, IL (US)

( * ) Notice: Subject to any disclaimer, the term of this patent is extended or adjusted under 35 U.S.C. 154(b) by 956 days.

(21) Appl. No.: 17/880,739

(22) Filed: Aug. 4, 2022

(65) Prior Publication Data

US 2024/0040943 A1      Feb. 8, 2024

(51) Int. Cl.
A01B 59/043          (2006.01)

(52) U.S. Cl.
CPC .................................. A01B 59/043 (2013.01)

(58) Field of Classification Search
CPC ... A01B 59/066; A01B 59/062; A01B 59/002; A01B 63/02; A01D 34/661
USPC .......................................... 280/477; 172/439
See application file for complete search history.

(56) References Cited

U.S. PATENT DOCUMENTS

| | | | | |
|---|---|---|---|---|
| 5,257,797 A | * | 11/1993 | Johnson ................. | B60D 1/465 |
| | | | | 280/490.1 |
| 5,743,339 A | * | 4/1998 | Alexander, III ..... | A01B 59/062 |
| | | | | 37/468 |
| 5,823,270 A | * | 10/1998 | Cooper .................. | A01B 59/06 |
| | | | | 172/439 |

| | | | | |
|---|---|---|---|---|
| 5,950,735 A | * | 9/1999 | Godbersen ........... | A01B 59/062 |
| | | | | 37/468 |
| 2006/0081382 A1 | * | 4/2006 | Tuttle ................... | A01B 59/062 |
| | | | | 172/439 |
| 2007/0000673 A1 | * | 1/2007 | Farnsworth .......... | A01B 59/066 |
| | | | | 172/439 |

(Continued)

FOREIGN PATENT DOCUMENTS

| | | |
|---|---|---|
| EP | 1269816 A1 | 1/2003 |
| EP | 1131992 B9 | 4/2009 |

(Continued)

OTHER PUBLICATIONS

Extended European Search Report and Written Opinion issued in European Patent Application No. 23184833.4, dated Jan. 2, 2024, in 08 pages.

(Continued)

*Primary Examiner* — Christopher B Wehrly
(74) *Attorney, Agent, or Firm* — Tucker Ellis LLP; Patrick F. Clunk

(57) ABSTRACT

Provided is a hitching assembly for coupling to a hitch assembly on a vehicle. The hitching assembly includes a single point assembly including a first attachment area for attaching to the hitch assembly and a support passage extending through the single point assembly, a two-point assembly extending through the support passage, the two-point assembly having second and third attachment areas for attaching to the hitch assembly, and one or more manually-operated latch mechanisms configured to couple the two-point assembly to the single point assembly. The two-point assembly is movable from a raised position where the two-point assembly is coupled to the single point assembly, to a lowered position where the two-point assembly is decoupled from the single point assembly to move relative to the single point assembly.

20 Claims, 9 Drawing Sheets

(56)                    References Cited

U.S. PATENT DOCUMENTS

| | | | | |
|---|---|---|---|---|
| 2010/0038882 | A1* | 2/2010 | Chimento | A01B 59/002 |
| | | | | 280/490.1 |
| 2015/0230388 | A1* | 8/2015 | Ribo | A01B 59/064 |
| | | | | 248/653 |
| 2017/0245416 | A1* | 8/2017 | Hyder | A01B 59/043 |
| 2017/0290258 | A1* | 10/2017 | Mollick | A01B 63/023 |
| 2018/0070524 | A1* | 3/2018 | Quoniam | A01B 59/062 |
| 2018/0359902 | A1* | 12/2018 | Mcadam | E01H 5/061 |
| 2019/0223369 | A1* | 7/2019 | Mollick | A01B 69/008 |
| 2020/0100417 | A1* | 4/2020 | Bergum | A01D 34/866 |
| 2020/0337242 | A1* | 10/2020 | Billard | A01D 34/661 |

FOREIGN PATENT DOCUMENTS

| | | | | | |
|---|---|---|---|---|---|
| GB | 2023399 | A | * | 1/1980 | A01B 59/066 |
| GB | 2461511 | A | * | 1/2010 | A01B 59/002 |
| GB | 2479890 | A | * | 11/2011 | A01B 59/066 |
| WO | WO-2014125466 | A1 | * | 8/2014 | A01B 71/06 |

OTHER PUBLICATIONS

"How To Hook up Your 3-POINT Disc Mower" Bing.com/videos, [Retrieved on Aug. 2, 2022], 7 pages, Retrieved from the Internet <URL: https://www.bing.com/videos/search?q=vermeer+mounted+mower&docid=60804005811106 8742&mid=E4A64697303A2FD6212DE4A64697303A2FD6212D&view=detail&FORM=VIRE>.

"What is an iMatch Quick Hitch?," John Deere Hutson website, [Retrieved on Aug. 3, 2022], 4 pages, Retrieved from the Internet <URL: https://www.hutsoninc.com/knowledge-center/imatch-quick-hitch/>.

* cited by examiner

HITCHING ASSEMBLY

BACKGROUND

A tractor or utility vehicle used for agricultural work may be used for transport tasks and for carrying out tasks in the field. The tractor or utility vehicle can be coupled to an implement that has electoral couplers, hydraulic couplers, and/or a power takeoff that is connected to the tractor couplers and to the tractor power takeoff. Implements attached to a tractor or utility vehicle are generally not utilized full time, and thus a coupling mechanism is provided to allow for convenient connecting and disconnecting of the implement.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a hitching assembly for coupling to a hitch assembly on a vehicle is provided. The hitching assembly includes a single point assembly including a first attachment area for attaching to the hitch assembly and a support passage extending through the single point assembly, and a two-point assembly extending through the support passage, the two-point assembly having second and third attachment areas for attaching to the hitch assembly. The two-point assembly is movable from a raised position where the two-point assembly is coupled to the single point assembly to form a rigid assembly, to a lowered position where the two-point assembly is decoupled from the single point assembly to move relative to the single point assembly among a plurality of degrees of freedom for adjusting a position of the two-point assembly relative to the hitch assembly.

In another implementation, a hitching assembly for coupling to a hitch assembly on a vehicle is provided. The hitching assembly includes a single point assembly including a body portion having a first attachment area for attaching to the hitch assembly, and a support portion having a support passage extending therethrough, a two-point assembly including a support member extending through the support passage, one or more first arms attached to a first side of the support member that have a second attachment area for attaching to the hitch assembly, and one or more second arms attached to a second side of the support member that have a third attachment area for attaching to the hitch assembly, and one or more manually-operated latch mechanisms configured to couple the two-point assembly to the single point assembly. The two-point assembly is movable from a raised position where the two-point assembly is coupled to the single point assembly by the one or more manually-operated latch mechanisms to form a rigid assembly, to a lowered position where the two-point assembly is decoupled from the single point assembly to move relative to the single point assembly while being constrained by the support passage.

In still another implementation, an implement is provided having a functional portion, a lifting assembly attached to the functional portion, and a hitching assembly. The hitching assembly includes a single point assembly including a rear portion coupled to the lifting assembly, a body portion coupled to the rear portion having a first attachment area for attaching to a hitch assembly of a vehicle, and a support portion having a support passage extending therethrough, and a two-point assembly including a support member extending through and being constrained by the support passage, one or more first arms extending from the support member having a second attachment area for attaching to the hitch assembly, and one or more second arms extending from the support member having a third attachment area for attaching to the hitch assembly. The two-point assembly is movable from a raised position coupled to the single point assembly to a lowered position decoupled from and movable relative to the single point assembly.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
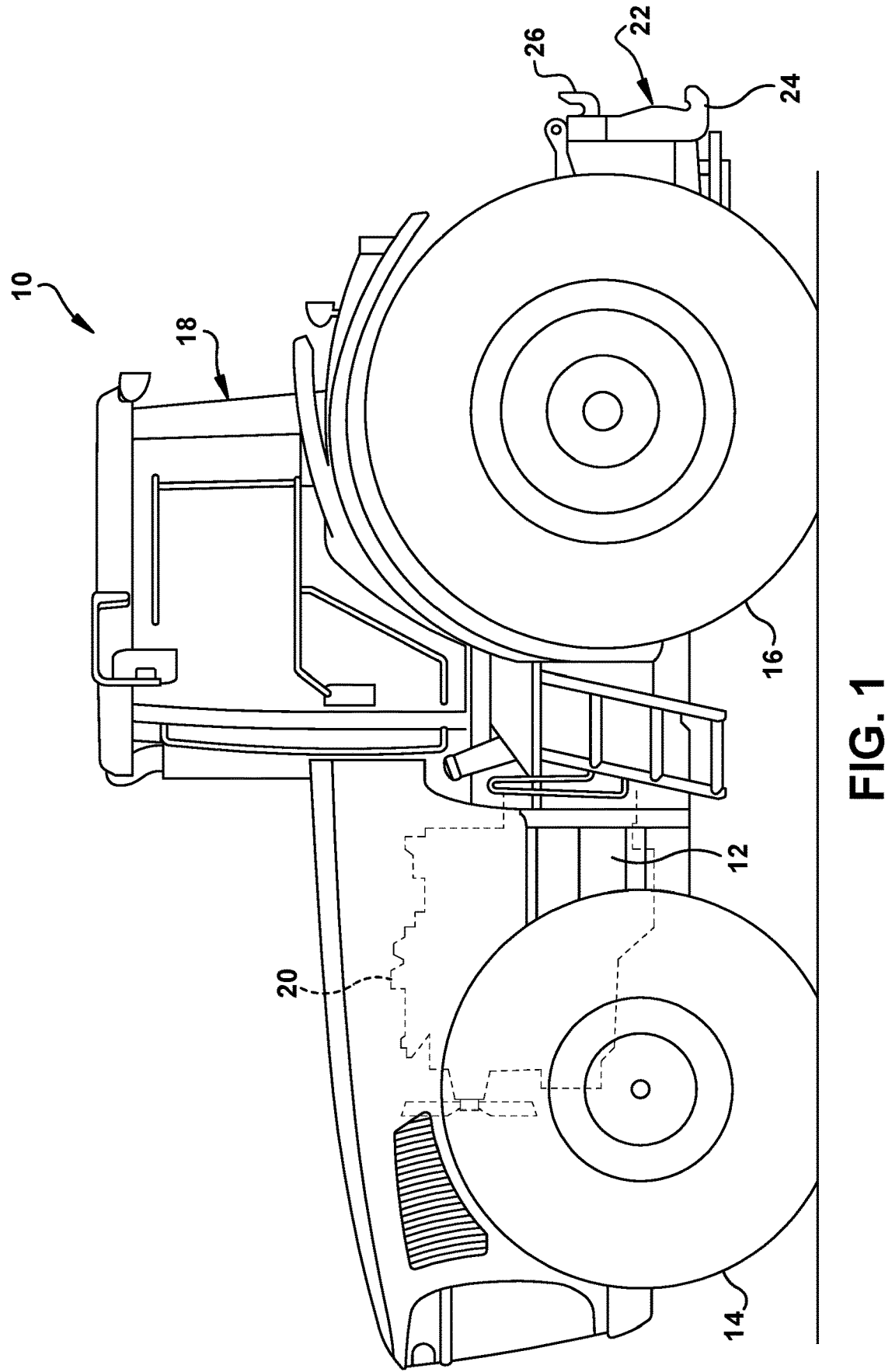
FIG. 1 is a side view of a tractor.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, a vehicle, such as a utility vehicle or tractor, is shown at reference numeral 10. The vehicle 10 includes a frame 12, front tires 14, rear tires 16, a vehicle cab 18, an engine 20, and a hitch assembly 22 having a suitable design, such as a three point hitch having pair of lower arms 24 and an upper arm 26. The engine 20 may be any suitable engine, such as a diesel engine, or alternatively may be replaced by a suitable electric motor assembly.

Figure 2:
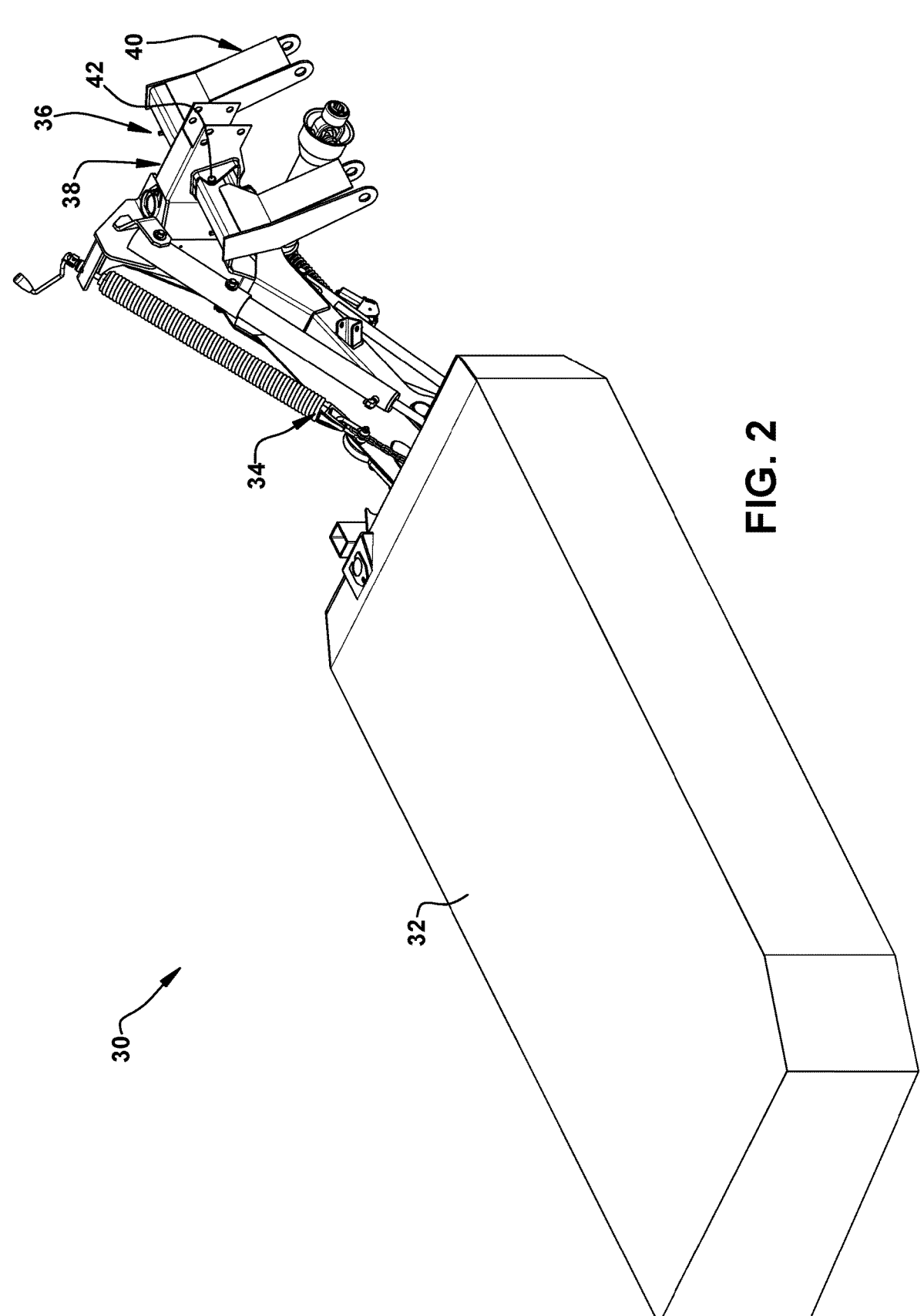
FIG. 2 is a perspective view of an exemplary implement.
Figure 3:
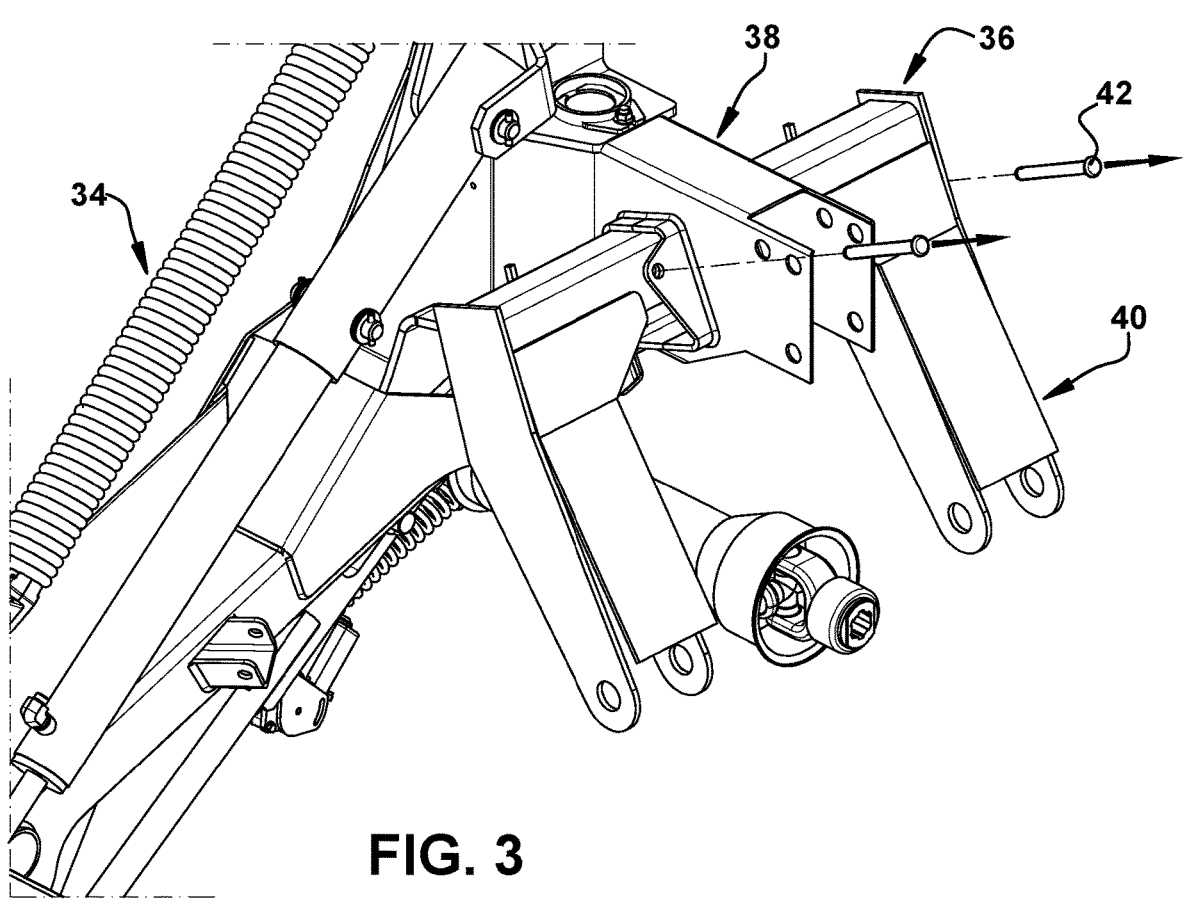
FIG. 3 is a partial perspective view of the implement illustrating a hitching assembly in a raised position.
Figure 4:
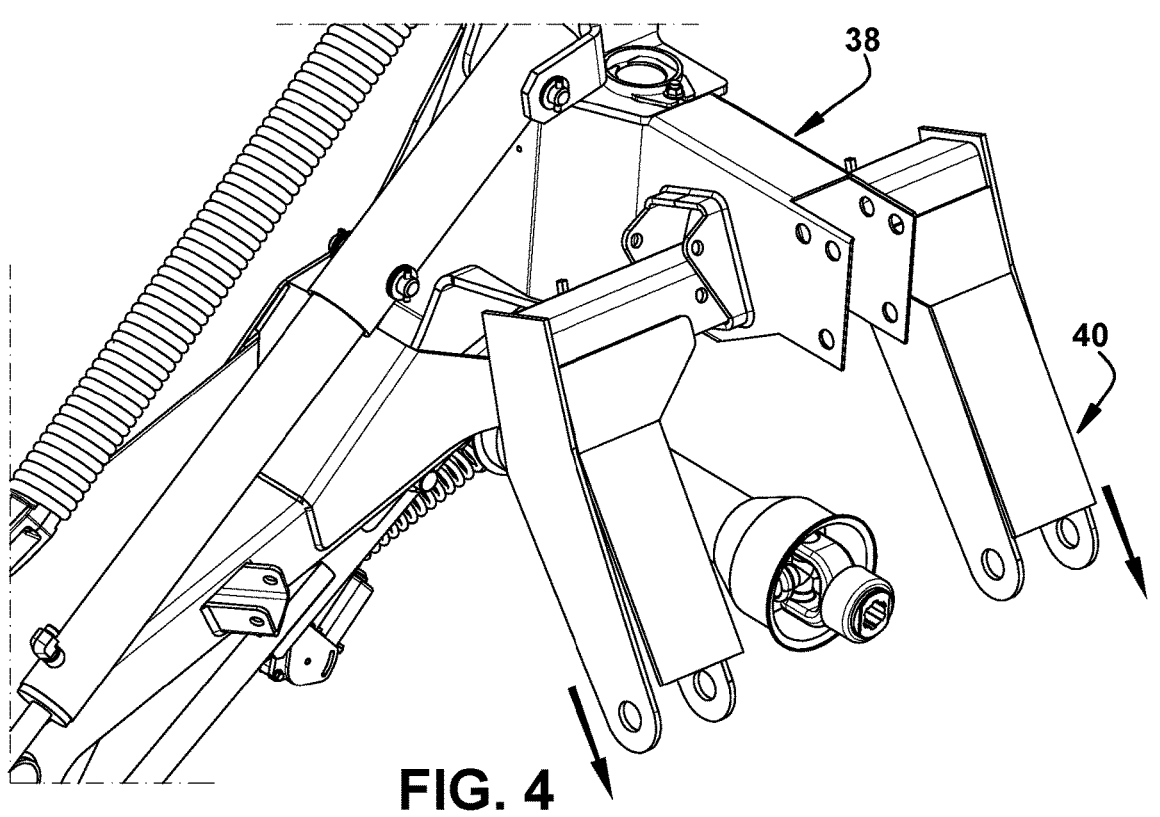
FIG. 4 is a partial perspective view of the implement illustrating the hitching assembly in a lowered position.
Figure 5:
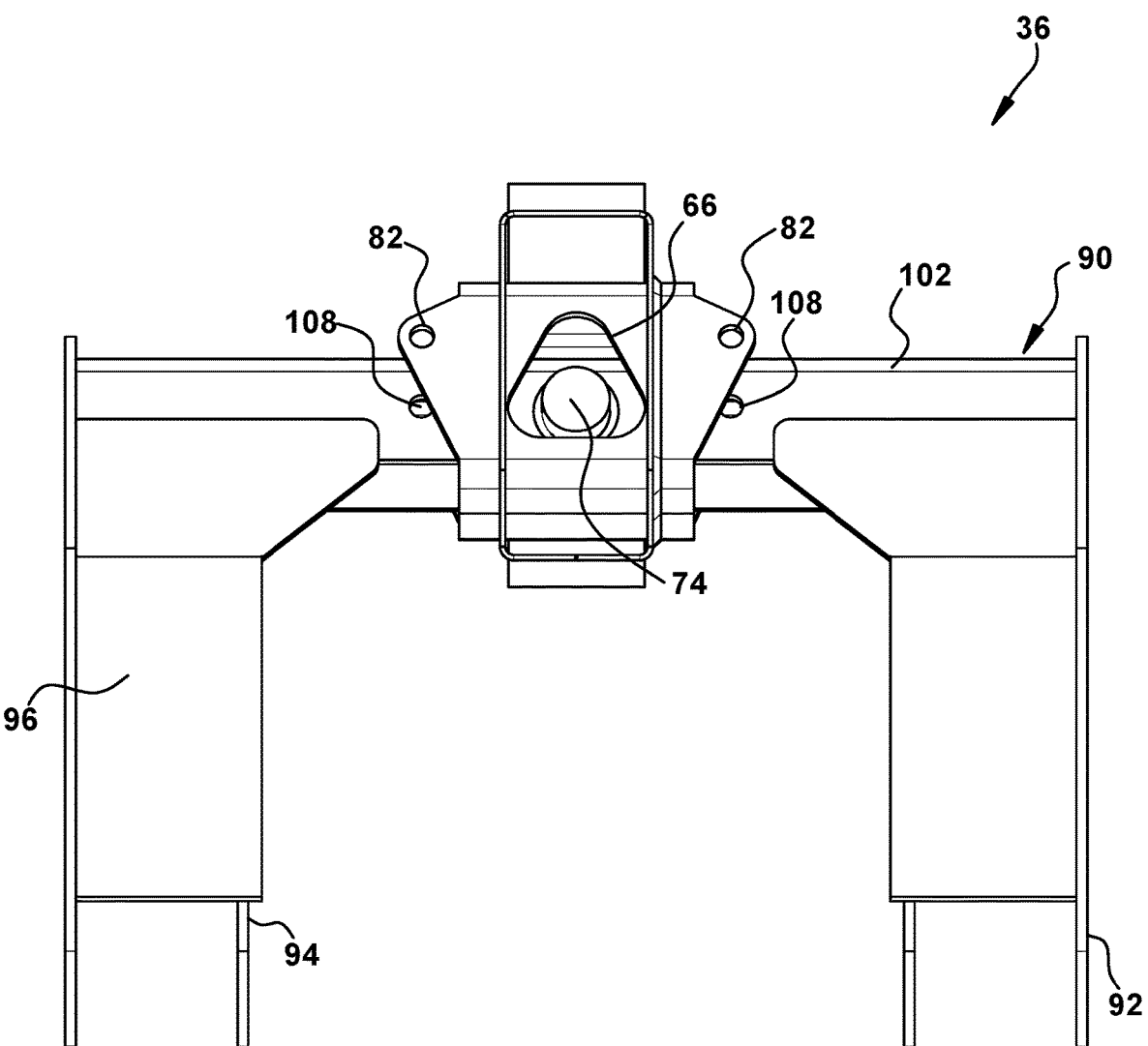
FIG. 5 is a front view of the hitching assembly in the lowered position.
Figure 6:
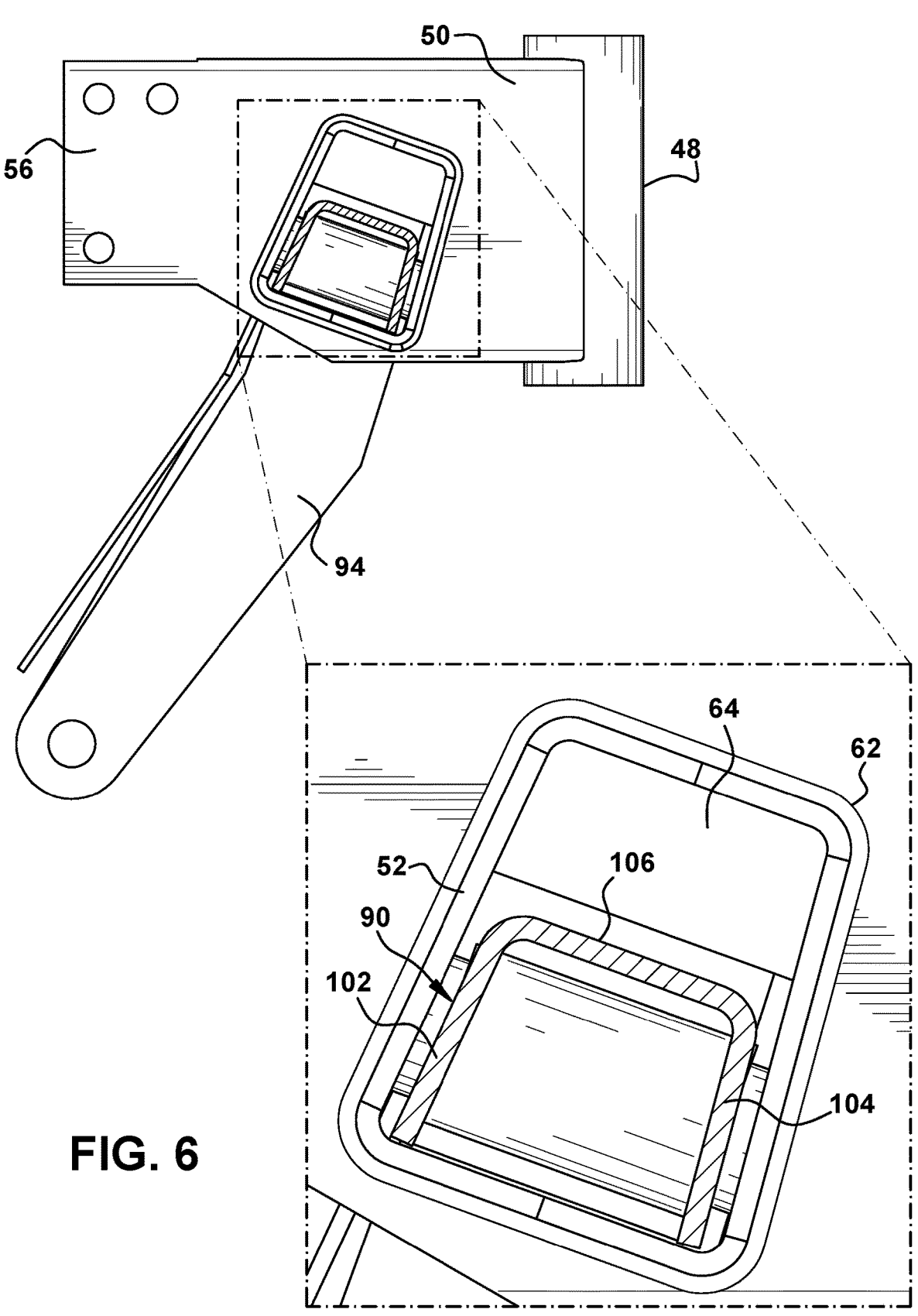
FIG. 6 is a cross-sectional view of the hitching assembly in the lowered position.
Figure 7:
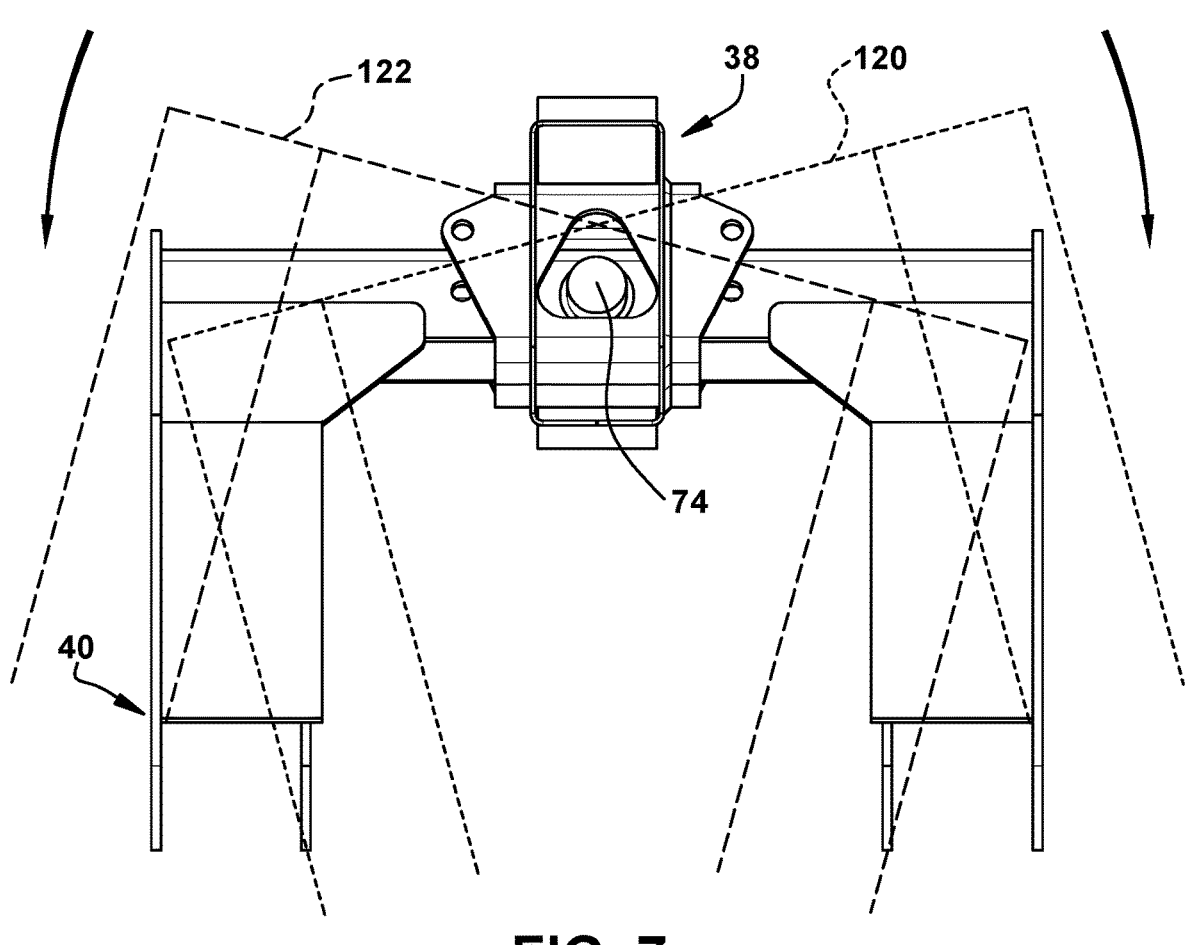
FIG. 7 is a front view of the hitching assembly illustrating angled movement of a two-point assembly relative to a single point assembly.
Figure 8:
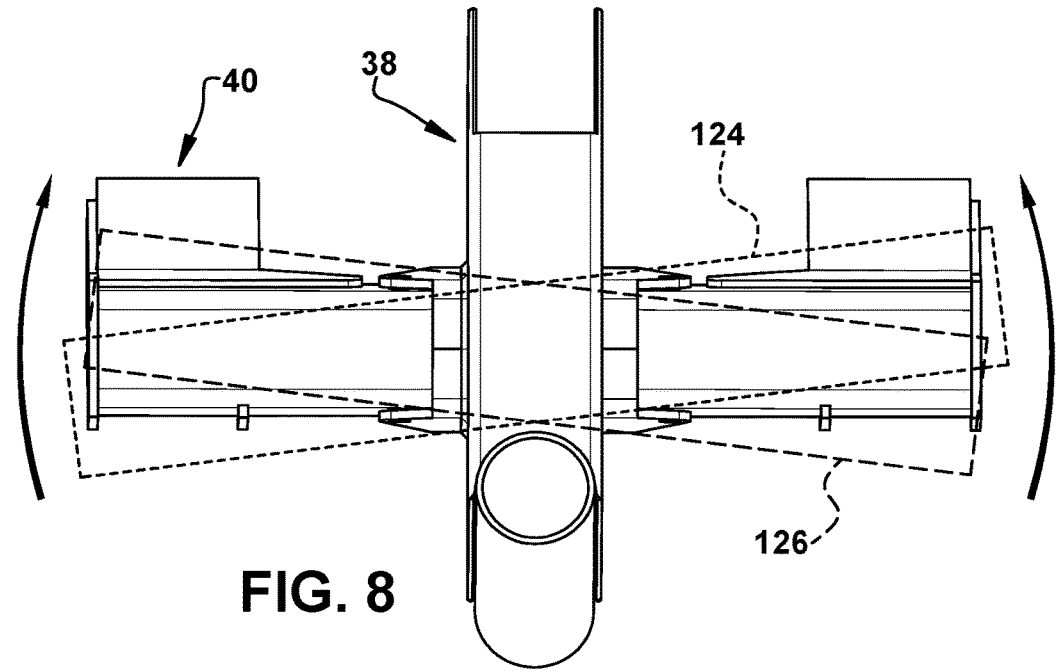
FIG. 8 is a top view of the hitching assembly illustrating forward and backward movement of the two-point assembly relative to the single point assembly.

Turning now to FIG. 2, an exemplary implement 30, such as a mower implement, is shown that can be attached to the hitch assembly 22. The implement includes a functional portion, such as a mower bar 32, a lifting assembly 34 attached to the mower bar 32, and a hitching assembly 36 attached to the lifting assembly 34. The hitching assembly 36 can include a first or single point assembly 38 and a second or two-point assembly 40 that can be coupled together by one or more manually-operated latch mechanisms 42, such as pins, spring-loaded latches, etc. in a raised position as shown in FIG. 3. The two-point assembly 40 can be decoupled but remain constrained by the single point assembly 38 and can be moved independently of the single point assembly 38. For example, the two-point assembly 40 may be moved to a lowered position as shown in FIGS. 4-6, moved at various angles in up and down directions relative to the single point assembly 38 as shown in FIG. 7, and moved at various angles in front to back directions relative to the single point assembly 38 as shown in FIG. 8.

Figure 9:
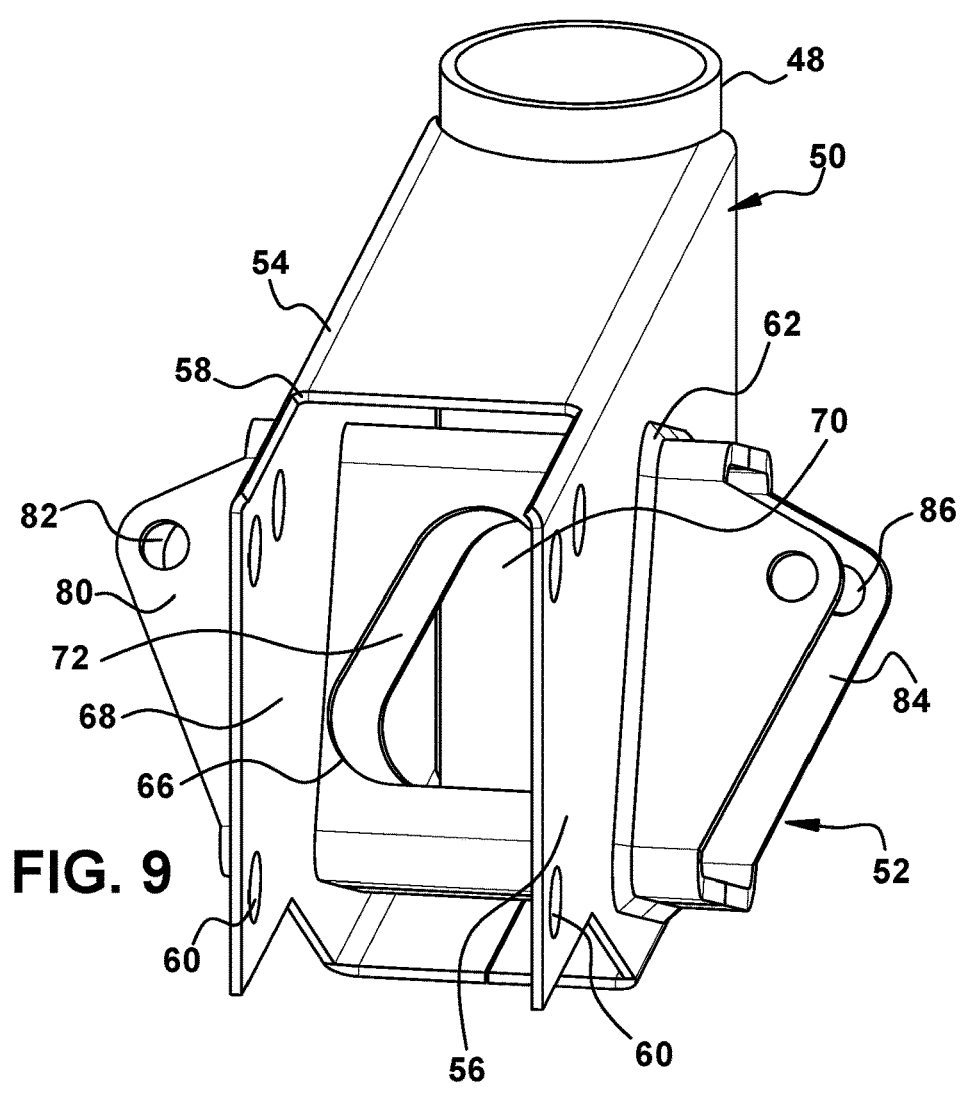
FIG. 9 is a perspective view of the single point assembly.
Figure 10:
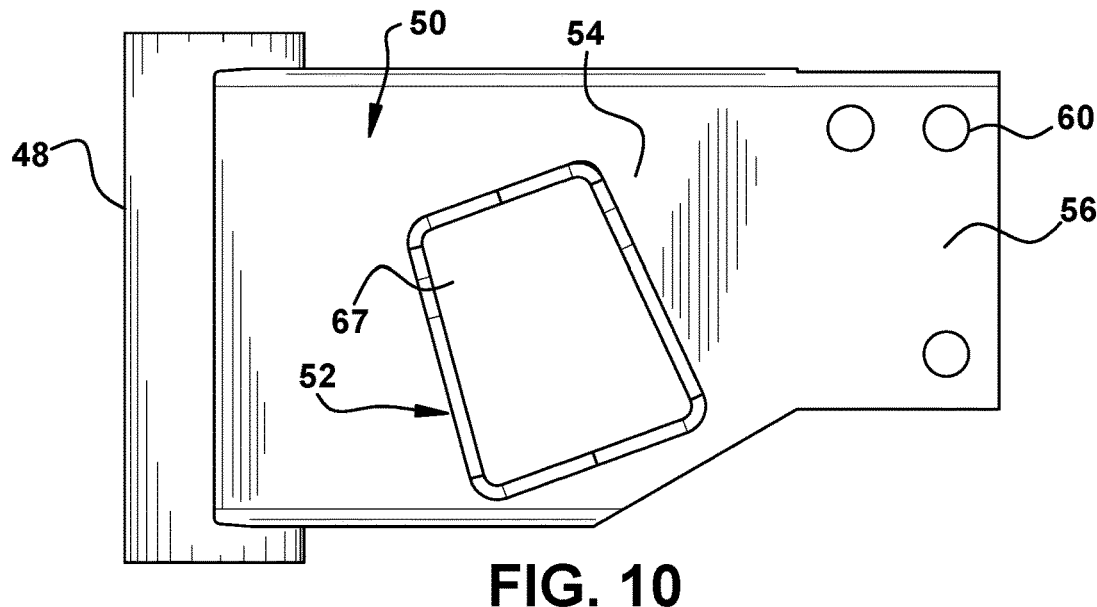
FIG. 10 is a side view of the single point assembly.

Turning additionally to FIGS. 9 and 10, the single point assembly 38 will be described in detail. The single point assembly 38 includes a rear portion 48, which is shown as tubular in shape but may have any suitable shape, for attaching to the lifting assembly 34 in a suitable manner, a body portion 50 for attaching to the upper arm 26, and a support portion 52 for constraining and coupling to the two-point assembly 40. The rear portion 48 may be coupled to the body portion 50 in a suitable manner, such as by welding, although it will be appreciated that the components may be integrally formed. The body portion 50 may include a base 54 coupled to the rear portion 48 that has a suitable shape, such as a substantially rectangular tubular shape, and a pair of laterally spaced projections 56 extending forward of the base 54. The base 54 includes openings 58 on each side thereof that are aligned with one another for receiving the support portion 52. The laterally spaced projections 56 form an attachment area for coupling to the upper arm 26. For example, the laterally spaced projections 56 may each having one or more openings 60, and as shown a plurality of openings 60 aligned with a corresponding opening 60 on the other laterally spaced projection 56. The plurality of openings 60 can receive a suitable pin(s) or other mechanism for interacting with the upper arm 26.

The support portion 52 extends through the openings 58 of the base 54 of the body portion 50, for example substantially perpendicular to the base 54, and may be coupled thereto in a suitable manner, such as by a weld 62, although it will be appreciated that the components may be integrally formed. The support portion 52 has a support passage 64 extending therethrough, a first opening 66 extending through a front face 68 into the support passage 64, and a second opening 70 extending through a rear face 72 into the support passage 64. In an embodiment, the first and second openings 66 and 70 extend substantially perpendicular to the support passage 64. The first and second openings 66 and 70 may be aligned with one another and each have a suitable geometry that converges towards a top of the respective opening 66, 70 and that allows for movement of the two-point assembly 40 relative to the single point assembly 38 and also serves to center the two-point assembly 40 relative to the single point assembly 38. For example, the first and second openings 66 and 70 may each have a substantially triangular shape with rounded corners, such as an equilateral triangular shape, where the rounded corners can be curved to correspond to a diameter of a latch mechanism 74, such as a pin 74 to allow for seating of the pin 74 in the corners. The pin 74 is movable about the openings 66 and 70 to constrain movement of the two-point assembly.

The front face 68 of the support portion 52 has a pair of opposed ears 80 protruding away from the sides of the base 54 past the openings 58, where each ear 80 has an opening 82 for receiving one of the manually-operated latch mechanisms 42. Similarly, the rear face 72 has a pair of opposed ears 84 protruding away from the sides of the base 54 past the openings 58, where each ear 84 has an opening 86 for receiving one of the manually-operated latch mechanisms 42. The openings 82 and 86 on the left side of the support portion 52 are aligned with one another and the openings 82 and 86 on the right side of the support portion 52 are aligned with one another for receiving the manually-operated latch mechanisms 42.

As best shown in FIG. 6, the support passage 64 is substantially trapezoidal in shape with rounded corners, such as an equilateral trapezoidal shape, where the top and bottom of the support passage 64 are substantially parallel to one another and the sides of the support passage 64 converge or angle toward the top of the support passage 64 such that the passage is narrower at its top than at its bottom. This configuration allows for the two-point assembly 40 to be locked relative to the single point assembly 38 when the two-point assembly is in the raised position at the top of the support passage 64, and allows for the two-point assembly 40 to be moved front to back within the support passage 64 when decoupled in the lowered position.

Figures 11, 12:
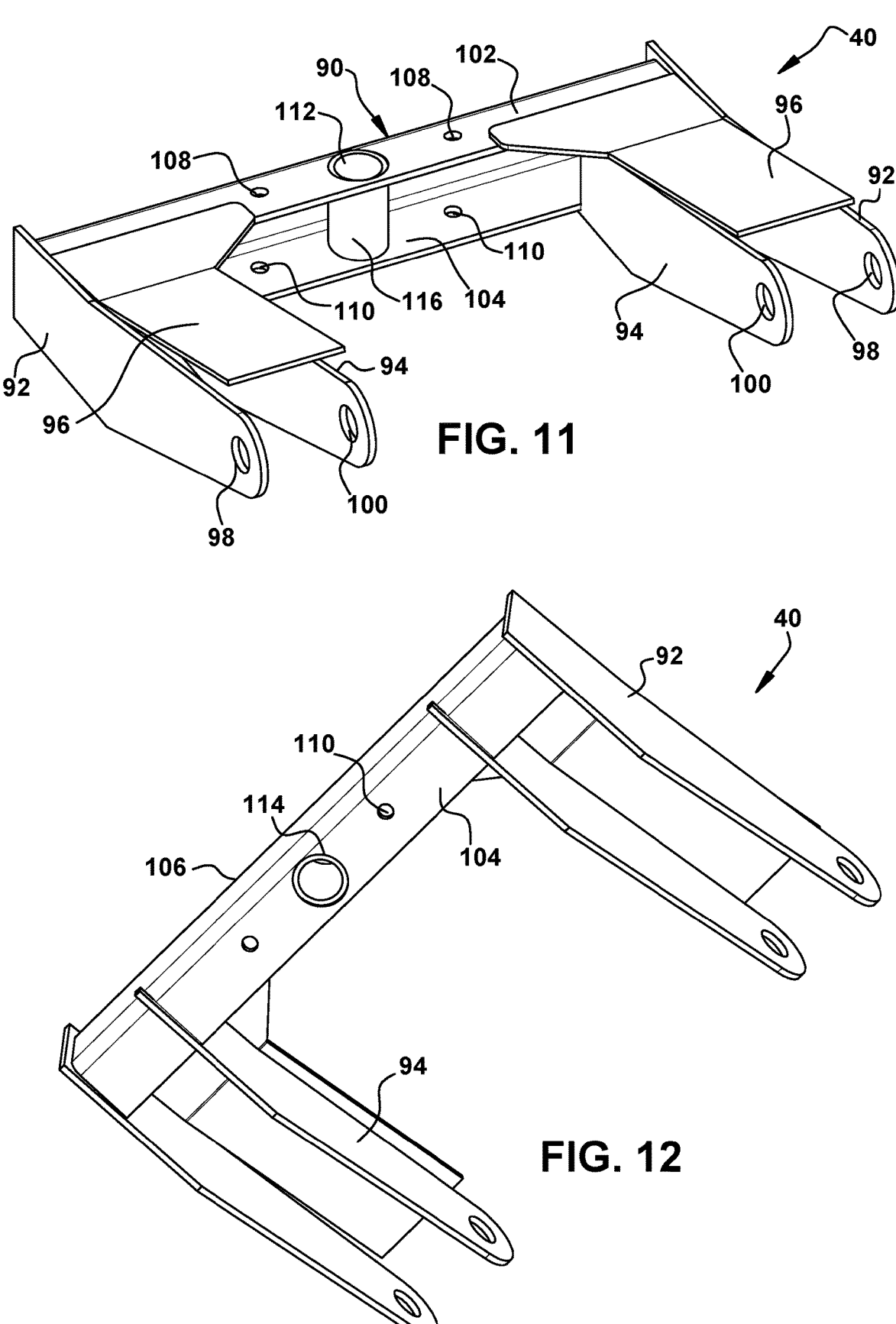
FIG. 11 is a perspective view of the two-point assembly.
FIG. 12 is another perspective view of the two-point assembly.

Turning additionally to FIGS. 11 and 12, the two-point assembly 40 will be described in detail. The two-point assembly 40 includes a support member 90 configured to extend through the support passage 64, a pair of outer arms 92 coupled to opposite ends of the support member 90, a pair of inner arms 94 laterally spaced from a respective one of the outer arms 92 and coupled to the support member 90, and a pair of reinforcement plates 96 coupled to a respective pair of the outer and inner arms 92 and 94 and the support member 90. The outer and inner arms 92 and 94 each form an attachment area for coupling to the lower arms 24. For example, each outer arm 92 may include an opening 98 and each inner arm 94 may include an opening 100 that is aligned with the respective opening 98 to receive a pin or the like for interacting with the respective lower arm 24.

The support member 90 has a profile substantially similar to the profile of the support passage 64. As shown, the support member 90 includes front and back non-parallel sides 102 and 104 that converge or angle toward a top wall 106 such that the support member 90 is narrower at its top than at its bottom. The support member 90 is shown without a bottom wall, although it will be appreciated that a bottom wall can be included to form a substantially trapezoidal shape similar to the support passage 64. The support member 90 also includes a pair of laterally spaced openings 108 on the front side 102 aligned with a respective one of a pair of laterally spaced openings 110 on the back side 104 for receiving a respect one of the manually-operated latch mechanisms 42, and a central opening 112 on the front side 102 aligned with a central opening 114 on the back side 104. The central openings 112 and 114 are configured to receive a tubular member 116, which may be attached to the support member 90 at the central openings 112 and 114 in a suitable manner, such as by welding, or may be integrally formed therewith.

After the support member 90 has been inserted through the support passage 64, the outer arms 92, inner arms 94, and reinforcement plates 96 may be coupled to the support member 90. It will be appreciated, however, that one side of the support member 90 may be coupled to one of the outer arms 92, one of the inner arms 94, and one of the reinforcement plates 96 prior to insertion through the support passage 64, and then after insertion the other side of the support member 90 may be coupled to the other of the outer arms 92, inner arms 94, and reinforcement plates 96. The pin 74 is also inserted through the first opening 66, through the tubular member 116, and through the second opening 70 after the support member 90 has been inserted through the support passage 64. Once inserted, the pin 74 may be coupled to the tubular member 116 in a suitable manner, such as by welding, or may be configured to be removably coupled to the tubular member 116. Once the pin 74 is coupled to the tubular member 116, the pin 74 and the support passage 64 will serve to constrain motion of the support member 90 relative to the support portion 52, while the geometry of the support member 90 and the support passage 64 will allow for movement of the support member 90 in any direction in all degrees of freedom.

Figure 13:
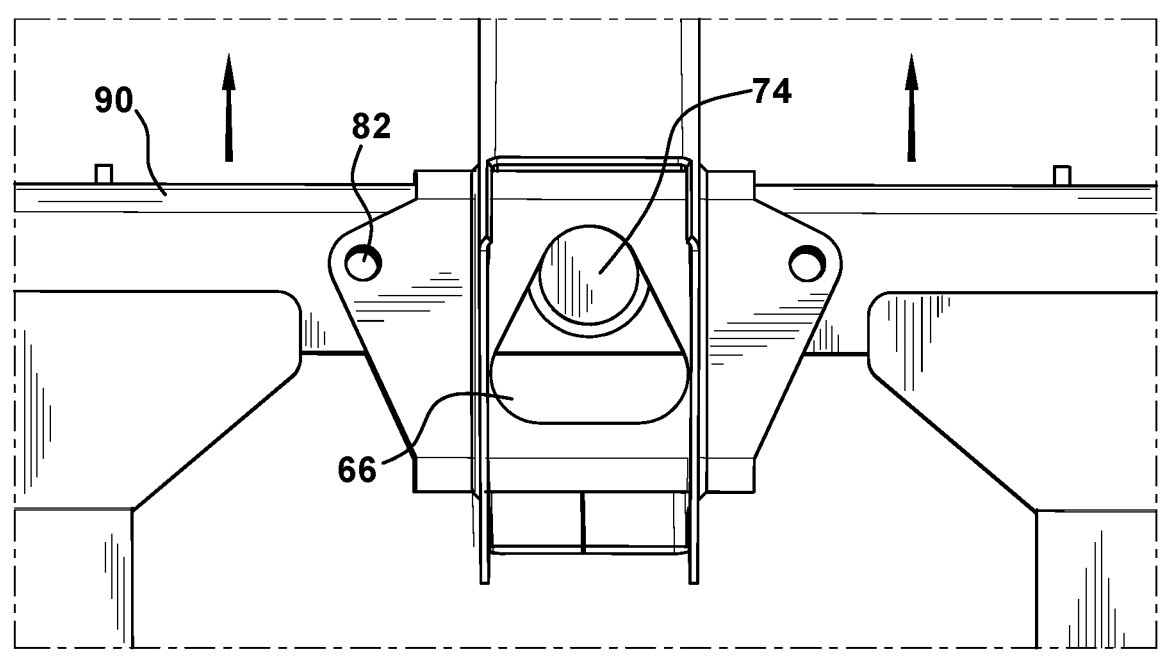
FIG. 13 is a partial front view of the hitching assembly in the raised position.
Figure 14:
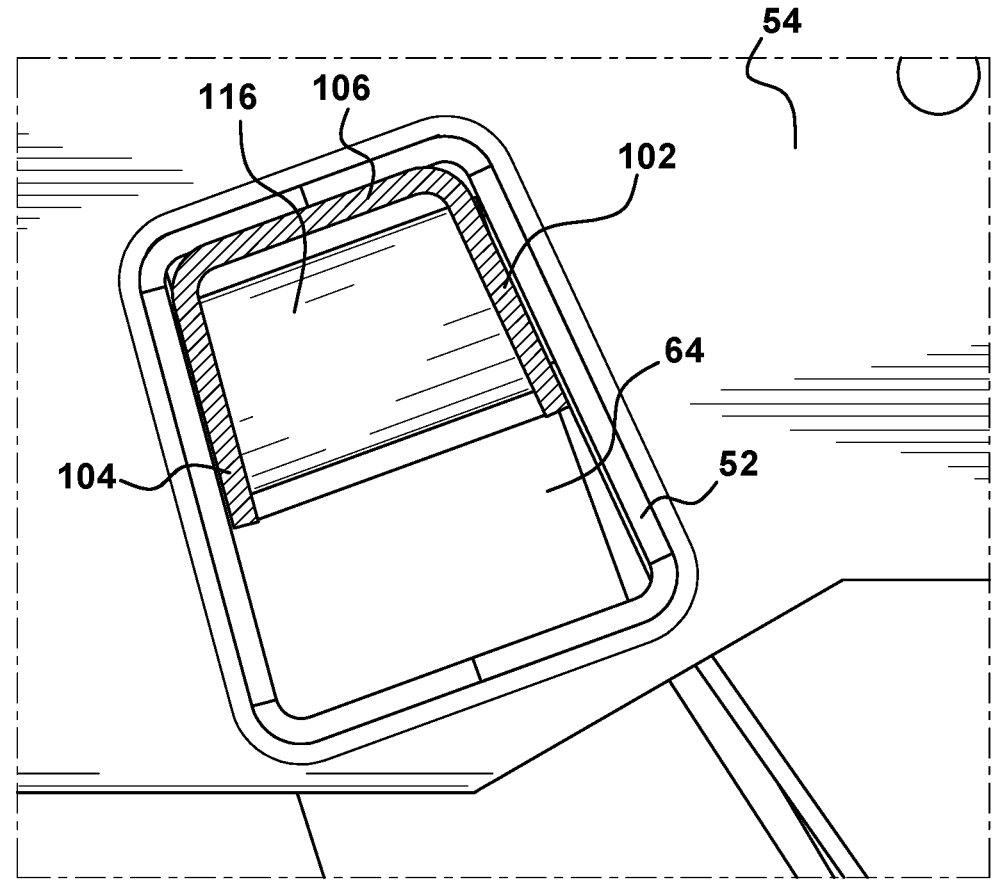
FIG. 14 is a partial cross-sectional view of the hitching assembly in the raised position.

Turning now to FIGS. 13 and 14 in addition to FIGS. 2-4, and 6-8, operation of hitching assembly 36 will be described in detail. When the openings 82 and 86 in the support portion 52 of the single point assembly 38 are aligned with the openings 108 and 110 in the support member 90 of the two-point assembly 40, and the manually-operated latch mechanisms 42 are inserted through the openings 82, 86, 108, and 110, the single point assembly 38 and two-point assembly 40 will be locked together forming a rigid three-point assembly as shown in FIG. 2. The three-point assembly can then be connected to the vehicle 10, for example to the pair of lower arms 24 and the upper arm 26. When in this raised position, the top wall 106 of the support member 90 is proximate to or abutting the top of the support passage 64, the front side 102 and back side 104 are proximate to or abutting the sides of the support passage 64, and movement of the support member 90 is restricted by the support passage 64.

In some instances, for example when a user desires to connect the vehicle 10 to the implement 30 on uneven terrain, the two-point assembly 40 can be decoupled from the single point assembly 38 to facilitate this connection to the vehicle 10. To decouple the single point assembly 38 and the two-point assembly 40, the manually-operated latch mechanisms 42 are removed, and the two-point assembly 40 will move downward to a bottom of the support portion 52 as shown in FIGS. 4-6 to move relative to the single point assembly 38 while remaining constrained by the support portion 52. The user can then move the two-point assembly 40 relative to the vehicle 10 to align the pins or the like extending through the openings 98 and 100 in the outer and inner arms 92 and 94 with the lower arms 24. As best shown in the detailed view of FIG. 6, when in this lowered position, a gap is formed between the sides of the support passage 64 and the front side 102 and back side 104 of the support member 90 to allow the position of the two-point assembly 40 to be adjusted.

For example, as shown by reference numeral 120 in FIG. 7, the two-point assembly 40 may be angled such that the outer and inner arms 92 and 94 on the left side of the two-point assembly 40 are near a bottom of the support passage 64 and the outer and inner arms 92 and 94 on the right side of the two-point assembly 40 are near a top of the support passage 64 to allow for connection to a vehicle 10 at a first angle relative to the implement 30. Similarly, as shown by reference numeral 122 in FIG. 7, the two-point assembly 40 may be angled such that the outer and inner arms 92 and 94 on the right side of the two-point assembly 40 are near the bottom of the support passage 64 and the outer and inner arms 92 and 94 on the left side of the two-point assembly 40 are near the top of the support passage 64 to allow for connection to a vehicle 10 at a second angle relative to the implement 30. It will be appreciated that the two-point assembly 40 may be moved upward and downward to any suitable angle within the support passage 64 to accommodate for various angular offsets of the vehicle 10.

In another example, as shown by reference numeral 124 in FIG. 8, the two-point assembly 40 may be moved such that the outer and inner arms 92 and 94 on the left side of the two-point assembly 40 are moved forward toward a front of the support passage 64 and the outer and inner arms 92 and 94 on the right side of the two-point assembly 40 are moved backward toward a rear of the support passage 64 to allow for connection to a vehicle 10 at a third angle relative to the implement 30. Similarly, as shown by reference numeral 126 in FIG. 8, the two-point assembly 40 may be moved such that the outer and inner arms 92 and 94 on the left side of the two-point assembly 40 are moved backward toward the rear of the support passage 64 and the outer and inner arms 92 and 94 on the right side of the two-point assembly 40 are moved forward toward the front of the support passage 64 to allow for connection to a vehicle 10 at a fourth angle relative to the implement 30. It will be appreciated that the two-point assembly 40 may be moved forward and backward to any suitable angle within the support passage 64 to accommodate for various angular offsets of the vehicle 10. It will also be appreciated that the two-point assembly may be moved upward, downward, forward, and backward in any suitable configuration to allow for alignment of the two-point assembly 40 to the vehicle 10 in all degrees of freedom.

After the two-point assembly 40 has been aligned with the lower arms 24, the lower arms 24 of the hitch assembly 22 are raised, thereby raising the two-point assembly 40 relative to the single point assembly 38. As the two-point assembly 40 is raised, the gap between the front and back sides 102 and 104 of the support member 90 and the support passage 64 reduces due to the narrowing of the support passage 64 to locate the two-point assembly 40 and prevent front to back movement of the two-point assembly 40 relative to the single point assembly 46. The pin 74 will also be raised and converge to the top of the openings 66 and 70 to center the support member 90 relative to the single point assembly 38.

Once the two-point assembly is in the raised position, the manually-operated latch mechanisms 42 are inserted through the openings 82 and 86 in the support portion 52 and the openings 108 and 110 in the support member 90 to lock the single point assembly 38 and two-point assembly 40 together forming the rigid three-point assembly. It will be appreciated that the pin or the like extending through openings 60 in the laterally spaced projections 56 will be aligned with the upper arm 26 when the two-point assembly 40 is in the raised position.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A hitching assembly for coupling to a hitch assembly on a vehicle, the hitching assembly comprising:
a single point assembly including a first attachment area for attaching to the hitch assembly and a support portion having a support passage extending therethrough; and
a two-point assembly including a support member extending through the support passage, the two-point assembly having second and third attachment areas for attaching to the hitch assembly,
wherein the two-point assembly is movable from a raised position where the two-point assembly is coupled to the single point assembly to form a rigid assembly, to a lowered position where the two-point assembly is decoupled from the single point assembly to move the support member vertically within the support passage of the support portion from the raised position to the lowered position and among a plurality of degrees of freedom within the support passage while being constrained by the support passage for adjusting a position of the two-point assembly relative to the hitch assembly.

2. The hitching assembly according to claim 1, wherein sides of the support passage converge towards a top of the support passage, and wherein the support member has sides that converge towards a top of the support member.

3. The hitching assembly according to claim 2, wherein when the two-point assembly is in the raised position, the top of the support member is proximate the top of the support passage and movement of the support member is restricted by the support passage, and when the two-point assembly is in the lowered position, a gap is formed between the sides of the support passage and the sides of the support member to allow the position of the two-point assembly to be adjusted.

4. The hitching assembly according to claim 2, wherein the support passage is substantially trapezoidal in shape.

5. The hitching assembly according to claim 1, wherein the support member has a profile substantially similar to a profile of the support passage.

6. The hitching assembly according to claim 1, wherein the single point assembly includes a body portion having the first attachment area, a first opening extending through a side of the support portion into the support passage, and a second opening extending through another side of the support portion into the support passage, the first and second openings being aligned with one another.

7. The hitching assembly according to claim 6, wherein the first and second openings each have a geometry that converges towards a top of the respective opening.

8. The hitching assembly according to claim 7, further comprising a latch mechanism coupled to the two-point assembly and extending through the first and second openings to constrain motion of the two-point assembly and center the two-point assembly in the raised position.

9. The hitching assembly according to claim 7, wherein the first and second openings are substantially triangular in shape.

10. The hitching assembly according to claim 6, wherein the two-point assembly includes one or more arms attached to each side of the support member, the one or more arms on one side of the support member having the second attachment area and the one or more arms on the other side of the support member having the third attachment area.

11. The hitching assembly according to claim 10, wherein the support member includes laterally spaced openings configured to align with corresponding openings in the support portion in the raised position for receiving one or more manually-operated latch mechanisms.

12. The hitching assembly according to claim 1, further comprising one or more manually-operated latch mechanisms configured to couple the two-point assembly to the single point assembly.

13. A hitching assembly for coupling to a hitch assembly on a vehicle, the hitching assembly comprising:

a single point assembly including a body portion having a first attachment area for attaching to the hitch assembly, and a support portion having a support passage extending therethrough;

a two-point assembly including a support member extending through the support passage, one or more first arms attached to a first side of the support member that have a second attachment area for attaching to the hitch assembly, and one or more second arms attached to a second side of the support member that have a third attachment area for attaching to the hitch assembly; and one or more manually-operated latch mechanisms configured to couple the support member to the support portion, wherein the two-point assembly is movable from a raised position where the two-point assembly is coupled to the single point assembly by the one or more manually-operated latch mechanisms to form a rigid assembly, to a lowered position where the one or more manually-operated latch mechanisms are removed such that the two-point assembly is decoupled from the single point assembly to move the support member vertically within the support passage of the support portion from the raised position to the lowered position while being constrained by the support passage.

14. The hitching assembly according to claim 13, wherein sides of the support passage converge towards a top of the support passage and sides of the support member converge towards a top of the support member.

15. The hitching assembly according to claim 14, wherein when the two-point assembly is in the raised position, the top of the support member is proximate the top of the support passage and movement of the support member is restricted by the support passage, and when the two-point assembly is in the lowered position, a gap is formed between the sides of the support passage and the sides of the support member to allow a position of the two-point assembly to be adjusted.

16. The hitching assembly according to claim 13, wherein the support portion additionally includes a first opening extending through a side of the support portion into the support passage and a second opening extending through an opposite side of the support portion into the support passage, the first and second openings being aligned with one another.

17. The hitching assembly according to claim 16, wherein the first and second openings each have a substantially triangular geometry that converges towards a top of the respective opening.

18. The hitching assembly according to claim 17, further comprising a latch mechanism coupled to the support member and extending through the first and second openings in the support portion to constrain motion of the two-point assembly and center the two-point assembly in the raised position.

19. A hitching assembly for coupling to a hitch assembly on a vehicle, the hitching assembly comprising:

a single point assembly including a first attachment area for attaching to the hitch assembly and a support passage extending through the single point assembly, wherein sides of the support passage converge towards a top of the support passage; and a two-point assembly extending through the support passage, the two-point assembly having second and third attachment areas for attaching to the hitch assembly, wherein the two-point assembly includes a support member having sides that converge towards a top of the support member, wherein the two-point assembly is movable from a raised position where the two-point assembly is coupled to the single point assembly to form a rigid assembly, to a lowered position where the two-point assembly is decoupled from the single point assembly to move relative to the single point assembly among a plurality of degrees of freedom for adjusting a position of the two-point assembly relative to the hitch assembly, and wherein when the two-point assembly is in the raised position, the top of the support member is proximate the top of the support passage and movement of the support member is restricted by the support passage, and when the two-point assembly is in the lowered position, a gap is formed between the sides of the support passage and the sides of the support member to allow the position of the two-point assembly to be adjusted.

20. The hitching assembly according to claim 19, wherein the support passage is substantially trapezoidal in shape.

* * * * *